(12) United States Patent
Que

(10) Patent No.: US 9,766,388 B2
(45) Date of Patent: Sep. 19, 2017

(54) BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventor: Chengwen Que, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/778,146

(22) PCT Filed: May 6, 2015

(86) PCT No.: PCT/CN2015/078334
§ 371 (c)(1),
(2) Date: Nov. 23, 2016

(87) PCT Pub. No.: WO2016/169067
PCT Pub. Date: Oct. 27, 2016

(65) Prior Publication Data
US 2017/0102494 A1 Apr. 13, 2017

(30) Foreign Application Priority Data

Apr. 24, 2015 (CN) .......................... 2015 1 0201163

(51) Int. Cl.
*G02B 6/00* (2006.01)
*F21V 8/00* (2006.01)

(52) U.S. Cl.
CPC ......... *G02B 6/0026* (2013.01); *G02B 6/0031* (2013.01); *G02B 6/0068* (2013.01)

(58) Field of Classification Search
CPC .. G02B 6/0023; G02B 6/0026; G02B 6/0031; G02B 6/0068
USPC ......................................... 362/609, 612, 608
See application file for complete search history.

(56) References Cited

U.S. PATENT DOCUMENTS

| 8,545,087 | B2 * | 10/2013 | Kim ..................... | G02B 6/0018 362/602 |
| 9,519,097 | B2 * | 12/2016 | Chen .................... | G02B 6/0026 |
| 2007/0211491 | A1 * | 9/2007 | Chou .................... | G02B 6/0031 362/601 |

(Continued)

*Primary Examiner* — Julie Bannan
(74) *Attorney, Agent, or Firm* — Kim Winston LLP

(57) ABSTRACT

A backlight module is disclosed. The backlight module comprises a light guide plate, a light bar unit, which comprises a first light bar and a second light bar, and a quantum tube that is arranged between the light guide plate and the light bar unit. The quantum tube comprises a first light-entering side and a second light-entering side, wherein the first light-entering side is arranged on one side of the quantum tube far from the light guide plate, and the second light-entering side is adjacent to the first light-entering side. An outside wall of the quantum tube is provided with a reflection layer at a position thereof opposite to the second light-entering side. According to the present disclosure, the deployment of the spectrum in the backlight module can be realized with the cooperation of the first light bar and the second light bar, and thus the brightness and saturation of the backlight module can both be improved.

18 Claims, 2 Drawing Sheets

(56) References Cited

U.S. PATENT DOCUMENTS

| | | | | |
|---|---|---|---|---|
| 2011/0134658 A1* | 6/2011 | Shen | .................... | G02B 6/0085 |
| | | | | 362/609 |
| 2012/0261682 A1* | 10/2012 | Zhang | .................. | G02B 6/0018 |
| | | | | 257/89 |
| 2017/0059760 A1* | 3/2017 | You | ...................... | G02B 6/0003 |

* cited by examiner

BACKLIGHT MODULE AND LIQUID CRYSTAL DISPLAY DEVICE

CROSS REFERENCE TO RELATED APPLICATION

The present application claims the priority of Chinese patent application CN 201510201163.0, entitled "Backlight Module and Liquid Crystal Display Device" and filed on Apr. 24, 2015, the entirety of which is incorporated herein by reference.

FIELD OF THE INVENTION

The present disclosure relates to the technical field of liquid crystal display, and particularly to a backlight module and a liquid crystal display device comprising the backlight module.

BACKGROUND OF THE INVENTION

Quantum Dot backlight technology is one of the backlight technologies of large color gamut. According to the quantum dot backlight technology, a quantum tube is provided in the backlight module. In this case, when blue light that is emitted by a Light-Emitting Diode (LED) enters into the quantum tube, the quantum dots that are packaged in the quantum tube can be excited and emit red light and green light. Then, the red light and green light mix with part of the original blue light, so as to form white light with high color saturation which enters into a light guide plate. Therefore, light with higher color saturation can be provided to a liquid crystal display device, and the color performance ability of the liquid crystal display device can be significantly improved.

However, with respect to the traditional backlight module applying the quantum dot backlight technology, since the spectrum which enters into the light guide plate through the quantum tube mainly depends on composition ratio, particle sizes and shapes of the quantum dots, it is difficult to further improve the color saturation of the backlight module through spectrum deployment. Moreover, in the traditional backlight module, a single color LED is generally used as a light source thereof. In this case, light that is emitted by the single color LED and enters into the light guide plate after the excitation of the quantum tube has limited color saturation.

With respect to the aforesaid technical problem, a backlight module with higher color saturation and higher brightness is needed so as to eliminate the technical defect in the prior art.

SUMMARY OF THE INVENTION

In order to further improve color saturation of a backlight module, the present disclosure provides a novel backlight module and a liquid crystal display device comprising the backlight module.

The present disclosure provides a backlight module, comprising: a light guide plate, a light bar unit, comprising a first light bar and a second light bar, and a quantum tube that is arranged between the light guide plate and the light bar unit. The quantum tube comprises a first light-entering side facing the first light bar and a second light-entering side facing the second light bar. The first light-entering side is arranged on one side of the quantum tube far from the light guide plate, and the second light-entering side is adjacent to the first light-entering side. An outside wall of the quantum tube is provided with a reflection layer at a position thereof opposite to the second light-entering side. Light that is emitted by the first light bar enters into the quantum tube through the first light-entering side, part of the light that is emitted by the first light bar is used for exciting the quantum tube to emit light with different colors, and the other part of the light that is emitted by the first light bar mixes with the light with different colors to enter into the light guide plate at last. Light that is emitted by the second light bar enters into the quantum tube through the second light-entering side, and then enters into the light guide plate after being reflected by the reflection layer.

According to the present disclosure, the first light-entering side and the second light-entering side of the quantum tube in the backlight module are provided with the first light bar and the second light bar respectively. The first light bar is used for exciting the quantum dots in the quantum tube to emit light with different colors, which mixes with the light emitted by the first light bar, so as to form white light that enters into the light guide plate directly. The light that is emitted by the second light bar enters into the quantum tube through the second light-entering side, and then enters into the light guide plate after being reflected by the reflection layer. The second light bar serves as a compensation light source so as to compensate light with required colors. In this case, the deployment of spectrum can be realized, and brightness and saturation of the backlight module can both be improved. Moreover, according to the present disclosure, the reflection of the light can be further regulated and light flux of the backlight module can be increased through designing the structure of the quantum tube in a reasonable manner, so that the brightness and saturation of the backlight module can both be further improved.

According to some embodiments, the quantum tube has a round-shaped cross section, and the reflection layer is arranged on a circumferential wall of the quantum tube at a position thereof opposite to the second light-entering side. The light which enters from the second light-entering side can be reflected by the arc-shaped reflection layer to the light guide plate as much as possible, so that the light flux of the light guide plate can be increased, and thus the brightness and saturation of the backlight module can both be improved. A length of the reflection layer on the circumferential wall of the quantum tube is preferably a quarter of a circumference of the round quantum tube.

According to some embodiments, the quantum tube has a polygon-shaped cross section, and the reflection layer is arranged on an outside wall corresponding to one side of the polygon that is opposite to one side thereof on which the second light-entering side is arranged. Since the cross section of the quantum tube has a polygon shape, the wall of the quantum tube on which the reflection layer is arranged can have one reflection surface or a plurality of reflection surfaces. Through selecting an inclining angle of one reflection surface or arranging the plurality of reflection surfaces in a reasonable manner so as to form a cooperation thereamong, the light which enters from the second light-entering side can be reflected to the light guide plate as much as possible. In this case, the light after reflection can be utilized fully. Therefore, a utilization ratio of the reflective light can be increased, and thus the brightness and saturation of the backlight module can both be improved.

According to some embodiments, the outside wall of the quantum tube on which the reflection layer is arranged is inclined to the light guide plate. Since the outside wall of the quantum tube is inclined to the light guide plate, the light which enters from the second light-entering side can be reflected to the light guide plate sufficiently. The inclining angle is preferably in a range from 30° to 45°.

According to some embodiments, a light transmission area of the first light-entering side is equal to that of the second light-entering side. The light which enters from the first light-entering side and the light which enters from the second light-entering side can form, after passing through the quantum tube, white light to enter into the light guide plate with light of different colors in a reasonable proportion. According to the embodiment, the light transmission area of the second light-entering side can be regulated according to the light of a particular color which needs to be compensated, so as to regulate the light flux of the light of the particular color which needs to be compensated, and regulate the brightness and saturation of the white light that enters into the light guide plate.

According to some embodiments, the reflection layer is a metal layer that is coated on the outside wall of the quantum tube directly. It is easy and feasible to coat the metal layer directly on the outside wall of the quantum tube. Moreover, the production cost thereof can be reduced since it is unnecessary to design the reflection layer additionally. The reflection layer is preferably an Al layer or an Ag layer.

According to some embodiments, the first light bar is a blue LED, and the quantum tube at least comprises quantum dots that can be excited by blue light to emit red light and green light with different wavelengths. In this manner, the quantum dots in the quantum tube can be excited by the blue light that is emitted by the first light bar, and at least emit red light and green light, which can mix with the original blue light so as to form white light to enter into the light guide plate. During this procedure, the proportion of different colors of light in the white light can be changed, and the saturation of the white light after mixture can be changed.

According to some embodiments, the second light bar is a red LED. The red LED is used for compensating red light, so as to further improve the saturation of the light that enters into the light guide plate. According to the embodiment, the second light bar can be selected according to the light of a particular color which needs to be compensated. For example, if green light needs to be compensated, a green LED can be used. Preferably, in order to further improve the brightness and saturation of the backlight module, a plurality of LEDs with a same color or different colors can be arranged to serve as the second light bar.

According to some embodiments, the backlight module further comprises an optical diaphragm group and a reflective sheet that are arranged on an upper side and a lower side of the light guide plate respectively.

The present disclosure further provides a liquid crystal display device, which comprises the aforesaid backlight module.

The present disclosure has the following advantages compared with the prior art.

1) According to the present disclosure, the first light bar and the second light bar are used in cooperation with each other. The second light bar serves as the compensation light source so as to compensate the light of a particular color. In this case, the spectrum of the light which enters into the light guide plate can be re-deployed, and thus the brightness and saturation of the backlight module can both be improved.

2) According to the present disclosure, the spectrum can be further regulated through designing the structure of the quantum tube, so that the light flux of the backlight module can be increased, and the brightness and saturation of the backlight module can both be further improved.

3) According to the present disclosure, since the second light bar is provided, the total light flux that enters into the light guide plate can be increased, and thus the brightness of the backlight module can be improved. Therefore, when the traditional optical diaphragm and reflective sheet are used, the requirement for the optical diaphragm can be significantly reduced.

BRIEF DESCRIPTION OF THE DRAWINGS

The present disclosure will be illustrated in detail hereinafter with reference to the embodiments and the drawings. In the drawings.

Figure 1:
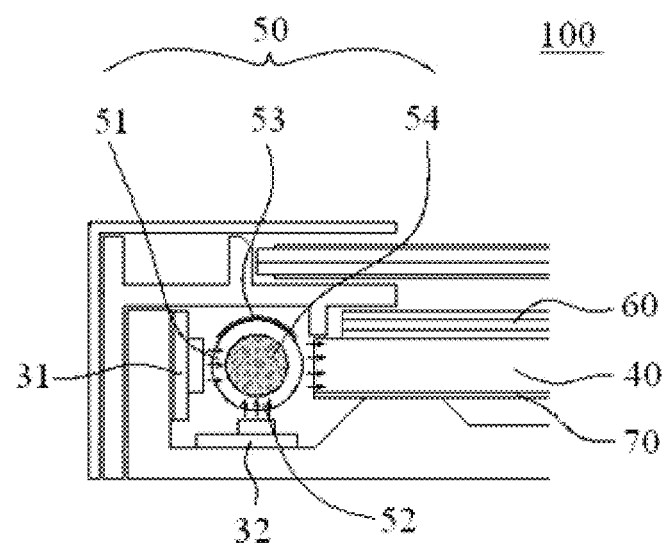
FIG. 1 schematically shows a structure of a backlight module according to a first embodiment of the present disclosure.

In the drawings, a same component is represented by a same reference sign. The drawings are not drawn according to actual scale.

DETAILED DESCRIPTION OF THE EMBODIMENTS

The present disclosure will be further illustrated hereinafter with reference to the drawings.

The details described herein are only specific examples used for discussing the implementations of the present disclosure. The most useful and most understandable description on the principle and concept of the present disclosure is provided. The structural details which go beyond the scope of basic understanding of the present disclosure are not provided herein. Therefore, those skilled in the art can clearly understand, based on the description and the accompanying drawings, how to implement the present disclosure in different ways.

FIG. 1 schematically shows a structure of a backlight module according to a first embodiment of the present disclosure. As shown in FIG. 1, the backlight module 100 comprises a light guide plate 40, a light bar unit, comprising a first light bar 31 and a second light bar 32, and a quantum tube 50 that is arranged among the light guide plate 40, the first light bar 31, and the second light bar 32. The quantum tube 50 comprises a first light-entering side 51 facing the first light bar 31, and a second light-entering side 52 facing the second light bar 32. The first light-entering side 51 is arranged on one side of the quantum tube 50 far from the light guide plate 40, and the second light-entering side 52 is adjacent to the first light-entering side 51. An outside wall of the quantum tube 50 is provided with a reflection layer 53 at a position thereof opposite to the second light-entering side 52. Part of light that is emitted by the first light bar 31 is used for exciting the quantum tube 50 to emit light with different colors, and the other part of the light that is emitted by the first light bar 31 mixes with the light with different colors and enters into the light guide plate 40 at last. Light that is emitted by the second light bar 32 enters into the quantum tube 50 through the second light-entering side 52, and then enters into the light guide plate 40 after being reflected by the reflection layer 53.

According to the present embodiment, the first light-entering side 51 and the second light-entering side 52 of the quantum tube 50 in the backlight module 100 are provided with the first light bar 31 and the second light bar 32 respectively. The first light bar 31 is used for exciting the quantum dots 54 in the quantum tube 50 to emit light with different colors, which mixes with the light emitted by the first light bar 31, so as to form white light that enters into the light guide plate 40 directly. The light that is emitted by the second light bar 32 enters into the quantum tube 50 through the second light-entering side 52, and then enters into the light guide plate 40 after being reflected by the reflection layer 53. The second light bar 32 serves as a compensation light source so as to compensate light with required colors. In this case, the deployment of spectrum can be realized, and brightness and saturation of the backlight module 100 can both be improved. Moreover, according to the present disclosure, the reflection of the light can be further regulated and light flux of the backlight module 100 can be increased through designing the structure of the quantum tube 50 in a reasonable manner, so that the brightness and saturation of the backlight module 100 can both be further improved.

According to an embodiment as shown in FIG. 1, a cross section of the quantum tube 50 has a round shape, and the reflection layer 53 is arranged on a circumferential wall of the quantum tube 50 opposite to the second light-entering side 52. The light which enters from the second light-entering side 52 can be reflected by the arc-shaped reflection layer 53 to the light guide plate 40 as much as possible, so that the light flux of the light guide plate 40 can be increased, and thus the brightness and saturation of the backlight module 100 can both be improved. A length of the reflection layer 53 on the circumferential wall of the quantum tube 50 is preferably a quarter of a circumference of the round quantum tube 50.

Figure 2:
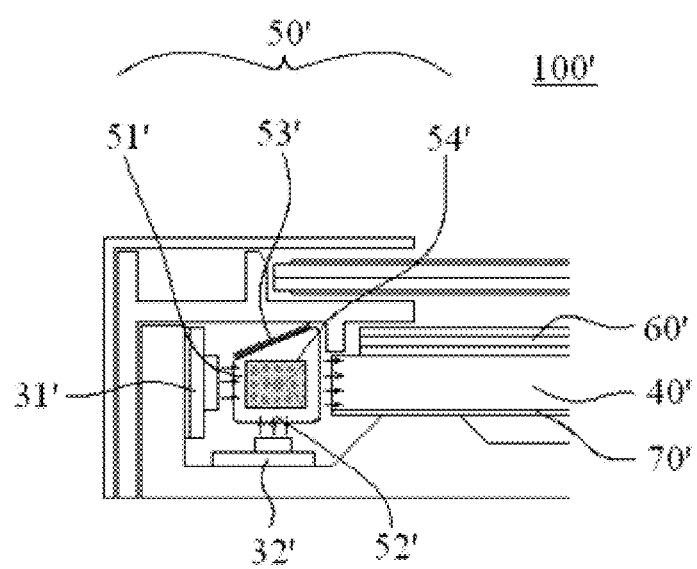
FIG. 2 schematically shows a structure of a backlight module according to a second embodiment of the present disclosure.

According to another embodiment as shown in FIG. 2, a cross section of the quantum tube 50' has a polygon shape, and the reflection layer 53' is arranged on an outside wall corresponding to one side of the polygon that is opposite to one side thereof on which the second light-entering side 52' is arranged. Since the cross section of the quantum tube 50' has a polygon shape, the wall of the quantum tube 50' on which the reflection layer 53' is arranged can have one reflection surface or a plurality of reflection surfaces. Through selecting an inclining angle of one reflection surface or arranging the plurality of reflection surfaces in a reasonable manner so as to form a cooperation thereamong, the light which enters from the second light-entering side 52' can be reflected to the light guide plate 40' as much as possible. In this case, the light after reflection can be utilized fully. Therefore, a utilization ratio of the reflective light can be increased, and thus the brightness and saturation of the backlight module 100' can both be improved.

Preferably, the outside wall of the quantum tube 50' on which the reflection layer 53' is arranged is inclined to the light guide plate 40'. Since the outside wall of the quantum tube 50' is inclined to the light guide plate 40', the light which enters from the second light-entering side 52' can be reflected to the light guide plate 40' sufficiently. The inclining angle is preferably in a range from 30° to 45°, and more preferably 45°.

According to the embodiments as shown in FIG. 1 and FIG. 2 respectively, a light transmission area of the first light-entering side 51 (51') is equal to that of the second light-entering side 52 (52'). The light which enters from the first light-entering side 51 (51') and the light which enters from the second light-entering side 52 (52') can form, after passing through the quantum tube 50 (50'), white light to enter into the light guide plate 40 (40') with light of different colors in a reasonable proportion. According to the embodiments, the light transmission area of the second light-entering side 52 (52') can be regulated according to the light of a particular color which needs to be compensated, so as to regulate the light flux of the light of the particular color which needs to be compensated, and regulate the brightness and saturation of the white light that enters into the light guide plate 40 (40').

Preferably, the reflection layer 53 (53') is a metal layer that is coated on the outside wall of the quantum tube 50 (50') directly. It is easy and feasible to coat the metal layer directly on the outside wall of the quantum tube. Moreover, the production cost thereof can be reduced since it is unnecessary to design the reflection layer additionally. The reflection layer is preferably an Al layer or an Ag layer.

According to the embodiment of the present disclosure as shown in FIG. 1, the first light bar 31 is a blue LED, and the quantum tube 50 at least comprises quantum dots 54 that can be excited by blue light to emit red light and green light with different wavelengths. In this manner, the quantum dots 54 in the quantum tube 50 can be excited by the blue light that is emitted by the first light bar 31, and at least emit red light and green light, which can mix with the original blue light so as to form white light to enter into the light guide plate 40. During this procedure, the proportion of different colors of light in the white light can be changed, and the saturation of the white light after mixture can be changed.

In addition, the second light bar 32 is a red LED. The red LED is used for compensating red light, so as to further improve the saturation of the light that enters into the light guide plate 40. According to the embodiment, the second light bar 32 can be selected according to the light of a particular color which needs to be compensated. For example, if green light needs to be compensated, a green LED can be used. Preferably, in order to further improve the brightness and saturation of the backlight module 100, a plurality of LEDs with a same color or different colors can be arranged to serve as the second light bar 32. It can be understood that, the same arrangement can also be applied to the embodiment as shown in FIG. 2, and the details of which are no longer repeated here.

According to the present disclosure, as shown in FIG. 1 and FIG. 2, the backlight module 100 further comprises an optical diaphragm group 60 and a reflective sheet 70 that are arranged on an upper side and a lower side of the light guide plate 40 respectively, and the backlight module 100' further comprises an optical diaphragm group 60' and a reflective sheet 70' that are arranged on an upper side and a lower side of the light guide plate 40' respectively. Since the second light bar 32 (32') is provided, the total light flux that enters into the light guide plate 40 (40') can be increased, and thus the brightness of the backlight module 100 (100') can be improved. Therefore, when the traditional optical diaphragm 60 (60') is used, the requirement for the optical diaphragm 60 (60') can be significantly reduced.

The present disclosure further provides a liquid crystal display device, which comprises the aforesaid backlight module 100 (100'). Compared with the traditional liquid crystal display device, the liquid crystal display device according to the present disclosure has higher brightness and higher color saturation, and thus the color performance ability thereof can be significantly improved.

It should be noted that, the above embodiments are described only for better understanding, rather than restricting the present disclosure. Those skilled in the art can make amendments to the present disclosure within the scope as defined in the claims and without departing from the spirit and scope of the present disclosure. The present disclosure is described according to specific methods, materials, and implementations, but the present disclosure is not restricted by the details disclosed herein. On the contrary, the present disclosure is applicable for the equivalent structures, methods, and applications with the same functions as those defined in the claims.

The invention claimed is:

1. A backlight module, comprising:
   a light guide plate;
   a light bar unit, comprising a first light bar and a second light bar; and
   a quantum tube that is arranged between the light guide plate and the light bar unit, the quantum tube comprising a first light-entering side facing the first light bar and a second light-entering side facing the second light bar, the first light-entering side being arranged on one side of the quantum tube far from the light guide plate, and the second light-entering side being adjacent to the first light-entering side,
   wherein an outside wall of the quantum tube is provided with a reflection layer at a position thereof opposite to the second light-entering side;
   wherein light that is emitted by the first light bar enters into the quantum tube through the first light-entering side, part of the light that is emitted by the first light bar is used for exciting the quantum tube to emit light with different colors, and the other part of the light that is emitted by the first light bar mixes with the light with different colors to enter into the light guide plate at last; and
   wherein light that is emitted by the second light bar enters into the quantum tube through the second light-entering side, and then enters into the light guide plate after being reflected by the reflection layer.

2. The backlight module according to claim 1, wherein the quantum tube has a round-shaped cross section, and the reflection layer is arranged on a circumferential wall of the quantum tube at a position thereof opposite to the second light-entering side.

3. The backlight module according to claim 1, wherein the quantum tube has a polygon-shaped cross section, and the reflection layer is arranged on an outside wall corresponding to one side of the polygon that is opposite to one side thereof on which the second light-entering side is arranged.

4. The backlight module according to claim 3, wherein the outside wall of the quantum tube on which the reflection layer is arranged is inclined to the light guide plate.

5. The backlight module according to claim 3, wherein a light transmission area of the first light-entering side is equal to that of the second light-entering side.

6. The backlight module according to claim 1, wherein the reflection layer is a metal layer that is coated on the outside wall of the quantum tube directly.

7. The backlight module according to claim 1, wherein the first light bar is a blue LED; and
   wherein the quantum tube at least comprises quantum dots that can be excited by blue light to emit red light and green light with different wavelengths.

8. The backlight module according to claim 7, wherein the second light bar is a red LED.

9. The backlight module according to claim 1, further comprising an optical diaphragm group and a reflective sheet that are arranged on an upper side and a lower side of the light guide plate respectively.

10. A liquid crystal display device, comprising a backlight module, which comprises:
    a light guide plate;
    a light bar unit, comprising a first light bar and a second light bar; and
    a quantum tube that is arranged between the light guide plate and the light bar unit, the quantum tube comprising a first light-entering side facing the first light bar and a second light-entering side facing the second light bar, the first light-entering side being arranged on one side of the quantum tube far from the light guide plate, and the second light-entering side being adjacent to the first light-entering side,
    wherein an outside wall of the quantum tube is provided with a reflection layer at a position thereof opposite to the second light-entering side;
    wherein light that is emitted by the first light bar enters into the quantum tube through the first light-entering side, part of the light that is emitted by the first light bar is used for exciting the quantum tube to emit light with different colors, and the other part of the light that is emitted by the first light bar mixes with the light with different colors to enter into the light guide plate at last; and
    wherein light that is emitted by the second light bar enters into the quantum tube through the second light-entering side, and then enters into the light guide plate after being reflected by the reflection layer.

11. The liquid crystal display device according to claim 10, wherein the quantum tube has a round-shaped cross section, and the reflection layer is arranged on a circumferential wall of the quantum tube at a position thereof opposite to the second light-entering side.

12. The liquid crystal display device according to claim 10, wherein the quantum tube has a polygon-shaped cross section, and the reflection layer is arranged on an outside wall corresponding to one side of the polygon that is opposite to one side thereof on which the second light-entering side is arranged.

13. The liquid crystal display device according to claim 12, wherein the outside wall of the quantum tube on which the reflection layer is arranged is inclined to the light guide plate.

14. The liquid crystal display device according to claim 12, wherein a light transmission area of the first light-entering side is equal to that of the second light-entering side.

15. The liquid crystal display device according to claim 10, wherein the reflection layer is a metal layer that is coated on the outside wall of the quantum tube directly.

16. The liquid crystal display device according to claim 10, wherein the first light bar is a blue LED; and
    wherein the quantum tube at least comprises quantum dots that can be excited by blue light to emit red light and green light with different wavelengths.

17. The liquid crystal display device according to claim 16, wherein the second light bar is a red LED.

18. The liquid crystal display device according to claim 10, further comprising an optical diaphragm group and a reflective sheet that are arranged on an upper side and a lower side of the light guide plate respectively.

* * * * *